(12) United States Patent
Rajagopal et al.

(10) Patent No.: US 10,110,462 B1
(45) Date of Patent: Oct. 23, 2018

(54) FALSE POSITIVE PROTECTION FOR NETWORK FUNCTION VIRTUALIZATION (NFV) VIRTUAL PROBE DEPLOYMENT

(71) Applicant: Sprint Communications Company L.P., Overland Park, KS (US)

(72) Inventors: Arun Rajagopal, Leawood, KS (US); Marouane Balmakhtar, Alexandria, VA (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 231 days.

(21) Appl. No.: 15/267,410

(22) Filed: Sep. 16, 2016

(51) Int. Cl.
  *G06F 15/173* (2006.01)
  *H04L 12/26* (2006.01)
  *H04W 88/16* (2009.01)
  *H04W 88/18* (2009.01)
  *H04L 12/715* (2013.01)

(52) U.S. Cl.
  CPC .............. *H04L 43/12* (2013.01); *H04L 43/16* (2013.01); *H04L 45/64* (2013.01); *H04W 88/16* (2013.01); *H04W 88/18* (2013.01)

(58) Field of Classification Search
  USPC ....................................................... 709/224
  See application file for complete search history.

(56) References Cited

U.S. PATENT DOCUMENTS 8,600,792 B2  12/2013 Drittler et al.
9,210,061 B2  12/2015 Richards et al.
9,311,160 B2   4/2016 Parker
9,588,815 B1 *  3/2017 Mistry ................. G06F 9/5077
(Continued)

FOREIGN PATENT DOCUMENTS

WO   2015061353   4/2015
WO   2015101153   7/2015
(Continued)

OTHER PUBLICATIONS

"The Virtual Probe: Assurance & Monitoring in the NFV/SDN Era;" Solutions for Software-powered Networks; White Paper; Dec. 2015; pp. 1-9; RADCOM; amdocs.

*Primary Examiner* — Umar Cheema
*Assistant Examiner* — John Fan

(57) ABSTRACT

A Network Function Virtualization (NFV) data system controls virtual Probe (vProbe) deployment in an NFV Infrastructure (NFVI). An NFV Management and Orchestration (MANO) system receives Key Performance Indicators (KPIs) for the NFVI and processes the KPIs to generate NFV indices. The MANO system processes the NFV indices to trigger a vProbe deployment in the NFVI. Before vProbe deployment, the NFV MANO system compares the NFV indices that triggered the vProbe deployment to false-positive vProbe deployment criteria. The NFV MANO system blocks the vProbe deployment when the NFV indices that triggered the vProbe deployment correspond to the false-positive vProbe deployment criteria. The NFV MANO system initiates the vProbe deployment when the triggering NFV indices do not correspond to the false-positive vProbe deployment criteria. The NFVI may execute SDN applications and controllers that communicate over a virtual switch that hosts the vProbe.

20 Claims, 6 Drawing Sheets

(56) References Cited

U.S. PATENT DOCUMENTS

| | | | | |
|---|---|---|---|---|
| 2013/0007261 | A1* | 1/2013 | Dutta | G06F 11/3006 709/224 |
| 2014/0022928 | A1* | 1/2014 | Zingale | H04L 43/12 |
| 2014/0201374 | A1 | 7/2014 | Ashwood-Smith et al. | |
| 2014/0317261 | A1 | 10/2014 | Shatzkamer et al. | |
| 2015/0063166 | A1 | 3/2015 | Sif et al. | |
| 2015/0089331 | A1 | 3/2015 | Skerry et al. | |
| 2015/0113132 | A1 | 4/2015 | Srinivas et al. | |
| 2015/0113133 | A1 | 4/2015 | Srinivas et al. | |
| 2015/0124622 | A1 | 5/2015 | Kovvali et al. | |
| 2015/0142935 | A1 | 5/2015 | Srinivas et al. | |
| 2015/0142936 | A1 | 5/2015 | Srinivas et al. | |
| 2015/0142962 | A1 | 5/2015 | Srinivas et al. | |
| 2015/0149613 | A1 | 5/2015 | Kakadia et al. | |
| 2015/0180730 | A1 | 6/2015 | Felstaine et al. | |
| 2015/0263979 | A1 | 9/2015 | Kasturi | |
| 2016/0164911 | A1* | 6/2016 | Karasaridis | H04L 63/1458 726/23 |
| 2016/0330140 | A1* | 11/2016 | Cook | H04L 12/4641 |
| 2017/0085459 | A1* | 3/2017 | Xia | H04L 43/12 |
| 2018/0024852 | A1* | 1/2018 | Yabushita | G06F 9/45558 |

FOREIGN PATENT DOCUMENTS

| | | |
|---|---|---|
| WO | 2015109443 | 7/2015 |
| WO | 2015135611 | 9/2015 |
| WO | 2015143610 | 10/2015 |
| WO | 2015183940 | 12/2015 |
| WO | 2016037479 | 3/2016 |

* cited by examiner

FALSE POSITIVE PROTECTION FOR NETWORK FUNCTION VIRTUALIZATION (NFV) VIRTUAL PROBE DEPLOYMENT

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a virtual layer (hypervisors, virtual containers, controllers) that control VNF access to NFV hardware (circuitry, memory, communication interfaces). The VNFs communicate with one another and with other systems over NFV virtual Switches (vSWs).

To implement a data communication service, an NFV Management and Orchestration (MANO) system drives the NFV hardware to execute and support the VNFs based on various descriptors for the data communication service. In NFV SDN systems, the VNFs may be SDN applications, SDN controllers, and virtual SDN data machines. The NFV SDN systems generate Key Performance Indicators (KPIs) that characterize their performance. The KPIs are then indexed in various ways to generate multiple NFV SDN indices. The NFV/SDN indices are used to trigger the installation of virtual Probes (vProbes). The deployed vProbes interact with the NFV vSWs to collect additional KPIs. Unfortunately, the deployment of vProbes is expensive. Sometimes these automatically deployed vProbes are unsuccessful and do not produce meaningful KPIs. Expensive but unsuccessful vProbes are a problem in current NFV SDNs.

Technical Overview

A Network Function Virtualization (NFV) data system controls virtual Probe (vProbe) deployment in an NFV Infrastructure (NFVI). An NFV Management and Orchestration (MANO) system receives Key Performance Indicators (KPIs) for the NFVI and processes the KPIs to generate NFV indices. The MANO system processes the NFV indices to trigger a vProbe deployment in the NFVI. Before vProbe deployment, the NFV MANO system compares the NFV indices that triggered the vProbe deployment to false-positive vProbe deployment criteria. The NFV MANO system blocks the vProbe deployment when the NFV indices that triggered the vProbe deployment correspond to the false-positive vProbe deployment criteria. The NFV MANO system initiates the vProbe deployment when the triggering NFV indices do not correspond to the false-positive vProbe deployment criteria. The NFVI executes NFV Virtual Network Functions (VNFs). The VNFs may comprise SDN application VNFs and SDN controller VNFs that communicate over an NFV virtual Switch (vSW) that hosts the deployed vProbe (vP).

DETAILED DESCRIPTION

Figure 1:
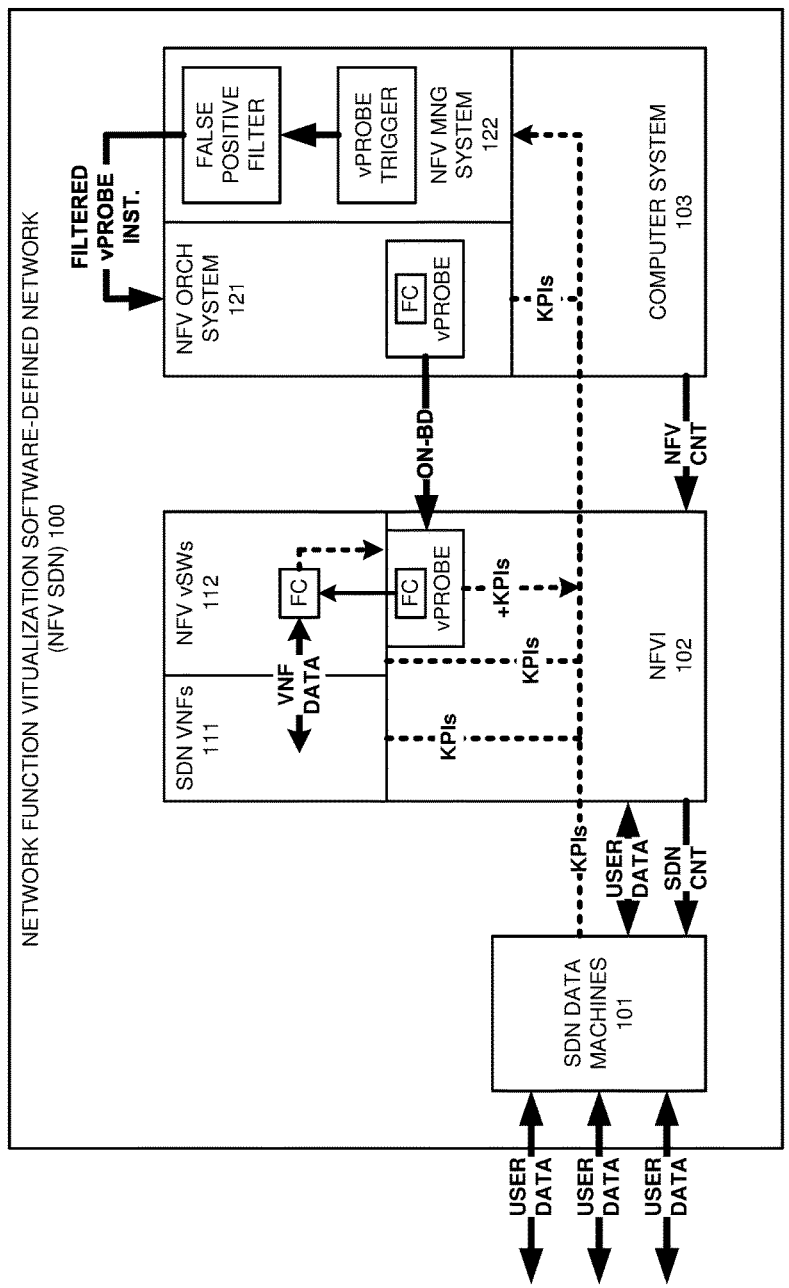
FIGS. 1-4 illustrate a Network Function Virtualization (NFV) Software Defined Network (SDN) to control the deployment of virtual Probes (vProbes).

FIGS. 1-4 illustrate Network Function Virtualization (NFV) Software-Defined Network (SDN) 100 to control the deployment of virtual Probes (vProbes). NFV SDN 100 exchanges user data for user devices like computers, phones, or some other intelligent machines. The data exchange supports data services such as content streaming, media conferencing, machine communications, internet access, or some other computerized information service. NFV SDN 100 comprises SDN data machines 101, NFV Infrastructure (NFVI) 102, and computer system 103. SDN data machines 101, NFVI 102, and computer system 103 each comprise data processing circuitry, data memory, operating software, and data communication transceivers. NFVI 102 and computer system 103 typically comprise data center equipment with virtualized computing resources.

NFVI 102 comprises SDN Virtual Network Functions (VNFs) 111 and NFV virtual Switches (vSWs) 112. Computer system 103 comprises NFV Orchestration (ORCH) system 121 and NFV Management (MNG) system 122. SDN VNFs 111 comprise SDN applications and controllers that are communicatively linked to each other through NFV vSWs 112. The SDN controllers are communicatively linked to SDN data machines 101 through NFV vSWs 112. Both the SDN applications and controllers are communicatively linked to computer system 103 through NFV vSWs 112.

To deliver a data service, SDN application VNFs 111 transfer SDN controller Application Programming Interface (API) calls to SDN controller VNFs 111. The SDN controller VNFs 111 receive and process the SDN controller API calls to generate and transfer SDN data machine API calls. SDN data machines 101 receive and process the SDN data machine API calls to perform actions on the user data like packet forwarding, storing, and dropping. Some user data may be transferred to NFVI 102 for more complex processing like video transcoding or decryption. SDN data machines 101 return data machine API responses to the SDN controller VNFs 111. In NFVI 102, SDN controller VNFs 111 receive and process the data machine API responses to generate and transfer SDN controller responses that are sent to the SDN application VNFs 111.

The components of NFV SDN 100 generate and transfer Key Performance Indicators (KPIs) to NFV management system 122—perhaps through NFV orchestration system 121. The KPIs characterize the current state of the NFV and SDN systems. Thus, the KPIs may comprise SDN metrics for SDN API calls and/or NFV metrics for Central Processing Unit (CPU), memory, and Input/Output (I/O) resources. The KPIs are typically processed to determine VNF performance and NFV usage.

The KPIs may comprise fairly raw metrics or they may be more advanced. For example, a KPI might be average transaction times for Flow Description Table (FDT) updates in SDN data machines 101. The logical distribution of advanced KPI development between the SDN/NFV systems and NFV management system 122 may vary. The KPIs may be sorted for network element or service specific data. For example, the KPIs for a given network element, network domain, forwarding graph, application point name, and the like may be isolated and indexed. Thus, the NFV SDN KPIs may be specific to networks, services, network elements, users, and the like.

NFV management system 122 processes the KPIs to generate various NFV SDN indices. NFV management system 122 may combine multiple indices into one or more combined indices. In a simplified example, NFV management system 122 may process KPIs to determine an amount of SDN API calls, SDN FDT updates, NFV I/O traffic, and NFV memory consumption for a specific Uniform Resource Indicator (URI). NFV management system 122 then develops an index for a data service based on these KPIs. A simple index might be:

$$[A*(\#API\ calls)+B*(\#FDT\ updates)]/[C*(NFV\ I/O\ traffic)+D*(NFV\ memory\ consumption)];$$

where A, B, C, and D are normalizing and scaling factors.

NFV management system 122 processes the NFV SDN indices to control SDN VNFs 111. NFV management system 122 may process the indices to on-board or relocate individual VNFs 111. NFV management system 122 may process the indices to de-allocate resources (darken) and re-allocate resources (lighten) individual VNFs 111. NFV management system 122 may process the indices to on-board additional NFV vSWs 112 into NFVI 102.

NFV management system 122 includes a virtual probe (vProbe) trigger to process the NFV SDN indices and automatically deploy vProbes in NFVI 102. The deployed vProbes typically collect additional NFV and SDN KPIs (+KPIs). The deployed vProbes may also collect +KPIs for specific VNF-based systems like Content Delivery Network (CDN) servers, Internet Protocol Multimedia Subsystem (IMS) servers, Internet protocol (IP) routers, Home Subscriber Systems (HSS), Mobility Management Entities (MMEs), and Packet Data Network Gateways (P-GWs).

NFV management system 122 further comprises a false-positive filter that maintains false-positive vProbe deployment criteria. The vProbe trigger transfers its vProbe instructions to the false-positive filter. Before vProbe deployment, the false-positive filter compares the NFV indices that triggered the vProbe deployment to its false-positive vProbe deployment criteria. When the NFV indices that triggered the vProbe deployment do not correspond to any false-positive vProbe deployment criteria, then NFV management system 122 directs NFV ORCH 121 to deploy the vProbe.

When the NFV indices that triggered the vProbe deployment correspond to the false-positive vProbe deployment criteria, then NFV management system 122 blocks the vProbe deployment. The false-positive vProbe deployment criteria may be identified in various ways including the use of historical data from past false positives. In particular, a historical pattern for one or more indices may be correlated in time to a previously unsuccessful vProbe deployment. Future vProbe deployments of this type are filtered against the historical pattern of indices.

In many cases, the historical patterns relate to network elements or systems that suffer temporary performance loss but that recover. In these cases, the false-positive vProbe deployment criteria corresponds to network element performance falling below a performance threshold for a time period, but then recovering after that time. In these situations, the recovering performance of the network elements is represented by the indices over time, and based on a match to one of these historical patterns, the false-positive filter blocks unnecessary vProbe deployments.

The historical PCI triggers from unsuccessful vProbe deployments may relate to network elements or systems that suffer temporary performance loss but that recover. In these cases, the false-positive vProbe deployment criteria corresponds to network element performance falling below a performance threshold for a first time period, but then recovering within a second time period. The network element and its corresponding performance threshold may correspond to a wireless network access point, internet protocol router, Internet Protocol Multimedia Subsystem (IMS) server, Content Delivery Network (CDN) server, and the like.

NFV management system 122 transfers filtered vProbe instructions to NFV orchestration system 121 when the false-positive filter allows the deployment. The filtered vProbe instructions direct NFV orchestration system 121 to install a vProbe with Filter Criteria (FC) to collect the +KPIs from NFVI 102. NFV orchestration system 121 transfers NFV control data to NFVI 102 to on-board the vProbe with the FC. NFVI 102 on-boards the vProbe and FC. The installed vProbe injects the FC into one or more NFV vSWs 112. The NFV vSWs 112 apply the FC to SDN VNF 111 traffic that traverses NFV vSWs 112. The NFV vSWs 112 transfer the filtered VNF traffic to the vProbe. The vProbe processes the filtered VNF data to generate the +KPIs for NFV management system 122. NFV management system 122 indexes the +KPIs along with the other KPIs.

For example, the standard KPIs and indices may cross a service quality threshold that triggers a vProbe deployment for a Content Delivery Network (CDN) operating in NFVI 102. NFV management system 122 filters the triggering NFV SDN indices before on-boarding the vProbe that will have FC to collect CDN+KPIs. The FC may comprise data like CDN prefixes, addresses, URIs, and the like. The FC may comprise specific NFV SDN data supporting the CDN like NFV Network Service Descriptor (NSDs), VNF Descriptors (VNFDs), VNF Forwarding Graphs (VNFFGs), and Physical Network Function Descriptions (PNFDs). The FC may also comprise NFV data supporting the CDN like processing core IDs, virtual machine IDs, memory locations, I/O transceivers, and the like.

In the CDN example, NFV management system 122 may deploy a specific vProbe for a particular CDN VNFFG to collect the CDN+KPIs. The specific CDN VNFFG could include downstream CDN (dCDN) server VNFs with CDN Interface (CDNI) VNF Components (VNFCs). The CDNI VNFC traffic for the CDN VNFFG could then be probed for video service metrics related to specific URIs pre-positioned at specific dCDN servers.

The vProbe injects the CDN FC for the CDN+KPIs into the NFV vSWs 112, and the CDN FCs filter VNF traffic based on the pertinent CDN NFV SDN data. The vProbe then transfers the CDN+KPIs to NFV management system 122. In this example, NFV management system 122 processes the +KPIs (and possibly the other KPIs) to perform a CDN efficiency analysis for NFVI 102. After performing the network task, NFV management system 122 may direct NFV orchestration system 121 to uninstall the vProbe from NFVI 102. NFV orchestration system 121 directs then NFVI 102 to uninstall the vProbe, and NFVI 102 off-boards the vProbe.

When NFV management system 122 directs NFV ORCH system 122 to deploy a vProbe, NFV management system 122 also stores the NFV indices that triggered the vProbe deployment. NFV management system 122 then determines whether the performance of the vProbe falls below a vProbe performance threshold. For example, the vProbe may not produce a threshold amount of relevant KPIs. The vProbe may produce plentiful KPIs, but the original trigger conditions may dissipate so quickly that these KPIs go unused. When NFV management system 122 determines that the performance of a deployed vProbe falls below its vProbe performance threshold, NFV management system 122 augments its false-positive vProbe deployment criteria with the stored NFV indices that triggered the deployment of the unsuccessful vProbe. In many case, the new false-positive criteria comprises a time-based pattern of indices. Future vProbe deployments based on these index patterns are then blocked in the future.

Figure 2:
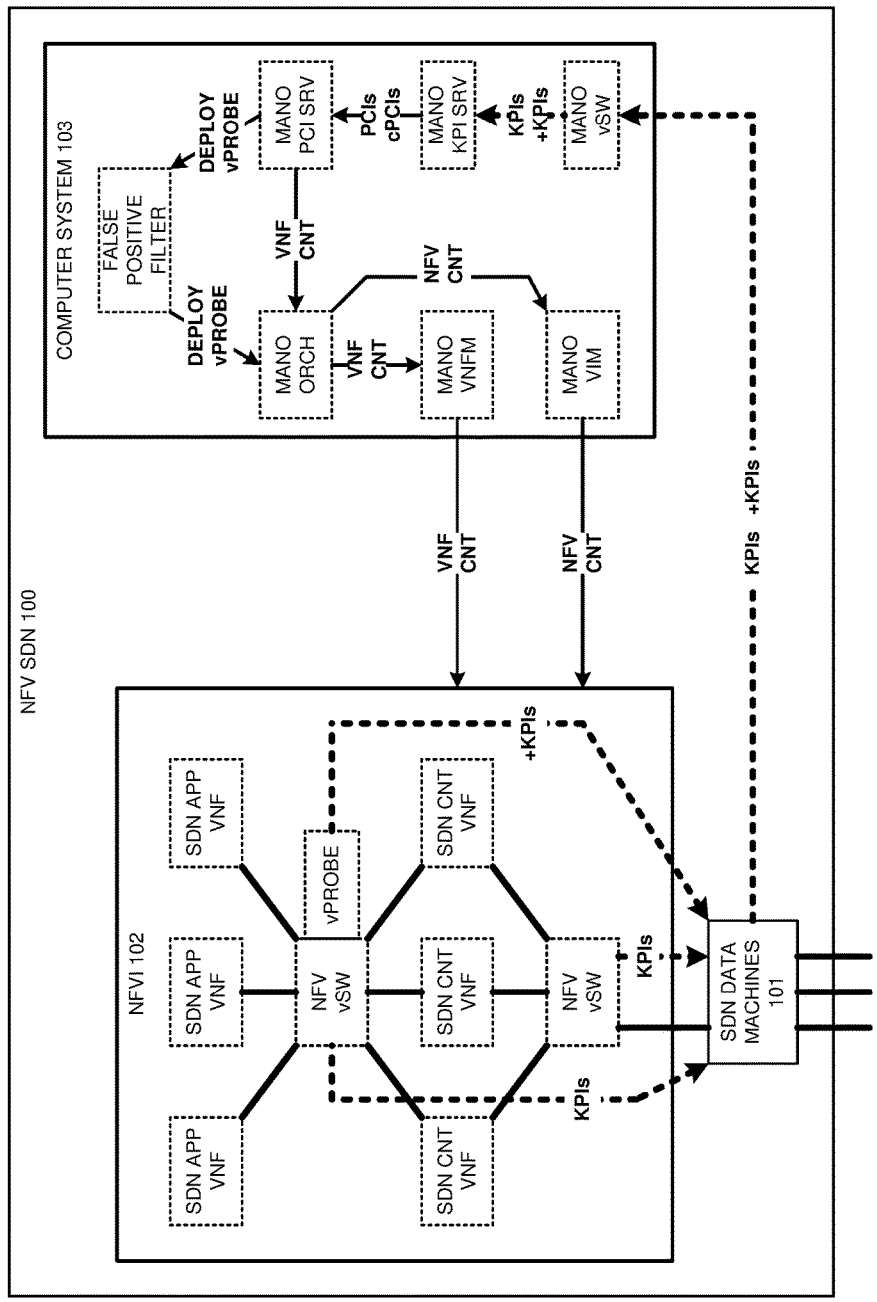

Referring to FIG. 2, NFV SDN 100 is further illustrated with an exemplary SDN architecture. NFVI 102 is shown with SDN application (APP) VNFs linked with SDN controller (CNT) VNFs through an NFV vSW. The SDN CNT VNFs are linked to SDN data machines 101 over another NFV vSW. Computer system 103 is shown with a MANO orchestrator (ORCH), VNF Manager (VNFM), Virtual Infrastructure Manager (VIM), MANO vSW, KPI server, PCI server, and false-positive filter. The MANO vSW is linked to SDN data machines 101.

To deliver the data service, the SDN application VNFs transfer SDN controller API calls to the SDN controller VNFs over the NFV vSW. The SDN controller VNFs receive and process the SDN controller API calls to generate and transfer SDN data machine API calls over the other NFV vSW. SDN data machines 101 receive and process the SDN data machine API calls to perform actions on the user data and return SDN data machine API responses. The SDN controller VNFs receive and process the data machine API responses to transfer SDN controller responses to the SDN application VNFs.

The NFV vSWs measure SDN KPIs and transfer SDN KPI data to the MANO KPI server through the MANO vSW. Typically, data machines 101, NFVI 102, VNFs, VIM, VNFM, and/or ORCH also measure KPIs and transfer KPI data to the MANO KPI server. The MANO KPI server processes the NFV/SDN KPI data to generate various system indices referred to as Proxy Correlation Indices (PCIs)—including combination PCIs (cPCIs). The MANO KPI server transfers the PCIs and cPCIs to the MANO PCI server.

The MANO PCI server processes the PCIs and cPCIs to control the SDN APP VNFs. In particular, the MANO PCI server processes the PCIs and cPCIs to on-board and off-board VNFs, to darken and lighten VNFs, and to relocate VNFs. For example, the SDN vSWs may measure and transfer VNF load KPIs, and the KPI server indexes the VNF load KPIs. The PCI server processes the VNF load indexes to identify an individual SDN APP VNF that should be darkened or relocated. SDN CNT VNFs may also be darkened and relocated.

The PCI server transfers VNF control data to the MANO ORCH. The MANO ORCH processes the VNF control data to generate VNF control data for the VNFM and NFV control data for the VIM. The MANO VIM and VNFM implement the NFV and VNF controls through NFVI 102. For example, NFVI 102 may darken one of the SDN APP VNFs by restricting its data processing, storage, and/or communication resources. The VNFM may notify the VNF and/or other VNFs of the VNF darkening. The VIM directs NFVI 102 to perform the VNF darkening. In another example, NFVI 102 may relocate one of the SDN APP VNFs to another NFVI. The VNFM may notify the VNF and/or other VNFs of the VNF relocation. The VIM directs NFVI s to perform the VNF relocation.

In addition to VNF control, the PCI server processes the NFV PCIs to trigger the deployment of vProbes. NFV management system 122 first transfers the vProbe deployment instructions to the false positive filter. The false positive filter compares the NFV indices that triggered the vProbe deployment to its false-positive vProbe deployment criteria. When the NFV indices that triggered the vProbe deployment do not correspond to any false-positive vProbe deployment criteria, then NFV management system 122 directs the MANO ORCH to deploy the vProbe. When the NFV indices that triggered the vProbe deployment correspond to the false-positive vProbe deployment criteria, then NFV management system 122 blocks the vProbe deployment. The false-positive vProbe deployment criteria may comprise historical PCI and cPCI patterns that are derived from past unsuccessful vProbe deployments.

The false positive filter transfers vProbe deployment instructions to the MANO ORCH. The MANO ORCH directs the VIM to on-board the vProbe and may direct the VNFM to support the vProbe installation. The installed vProbe sends its FC to the NFV vSW. The NFV vSW applies the FC to the SDN VNF traffic that traverses the NFV vSW. The NFV vSW transfers the filtered VNF traffic to the vProbe. The filtered VNF traffic typically comprises SDN application and/or SDN controller traffic. The vProbes process the filtered VNF data to generate and transfer the +KPIs to the MANO KPI server. The MANO KPI server processes the KPIs and the +KPIs to generate additional indices and PCIs and cPCIs. The MANO PCI server processes the PCIs and cPCIs to various perform network tasks.

When the false-positive filter directs the MANO ORCH to deploy a vProbe, the false positive filter stores the NFV indices that triggered the vProbe deployment. The false-positive filter determines whether vProbe performance falls below a vProbe performance threshold. The false-positive filter may receive data from the KPI and PCI servers to assess vProbe Performance. If the false-positive filter determines that the performance of a deployed vProbe falls below its vProbe performance threshold, the false-positive filter augments its false-positive vProbe deployment criteria with the stored NFV indices that triggered the deployment of the unsuccessful vProbe.

Figure 3:
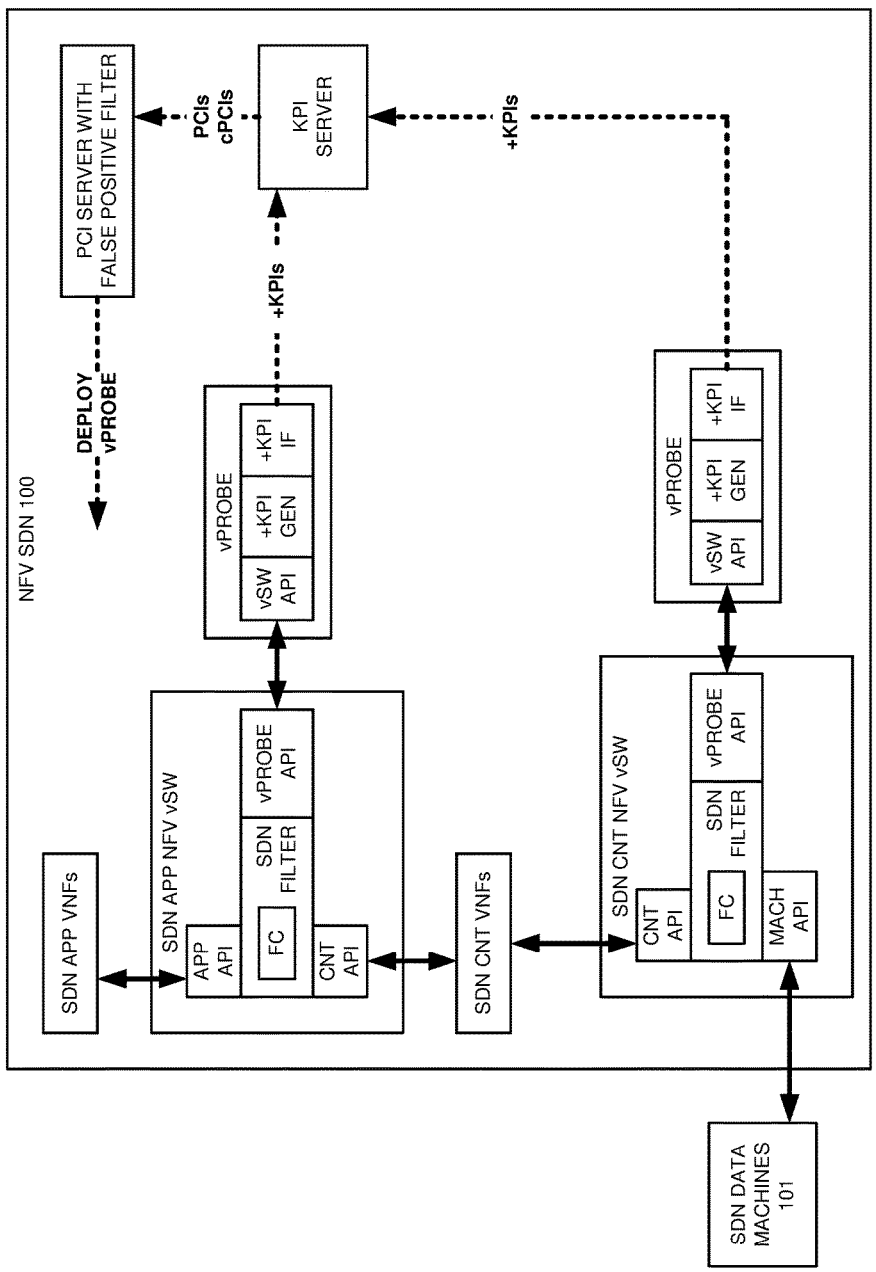

Referring to FIG. 3, exemplary vProbe deployments are further described for NFV SDN 100. The SDN APP VNFs communicate with the SDN CNT VNFs through an SDN APP NFV vSW. The SDN APP NFV vSW has an APP API to exchange API calls and responses with the SDN APP VNFs. The SDN APP NFV vSW also has a CNT API to exchange the API calls/responses with the SDN CNT VNFs. The SDN filter routes the API calls/responses between the APP API and the CNT API.

The SDN CNT NFV vSW has a CNT API to exchange API calls and responses with the SDN CNT VNFs. The SDN CNT NFV vSW also has a Machine (MACH) API to exchange the API calls/responses with SDN data machines 101. The SDN filter routes the API calls/responses between the CNT API and the MACH API.

When the vProbes are deployed, they inject their FC into the SDN NFV vSWs over the vSW and vProbe APIs. The SDN filters apply the FC from the SDN vProbes to select API calls, responses, and metadata (like FDT update API counts) to send to the vProbe over the vProbe API. In the vProbes, the vProbe API transfers the filtered VNF data to the vSW API. In the vProbes, the vSW API transfers the filtered VNF data to the +KPI GEN. The +KPI GEN processes the filtered VNF data to generate the +KPIs.

The vProbes may be inserted into existing vSWs or deployed in a new vSW. The NSD, VNFD, and VNFFG may specify the placement of the vProbes. The vProbes may be configured to detect and measure KPIs for specific users, networks, NFVIs, VNFs, IP prefixes, URIs, and the like. The vProbes may be configured to generate the +KPI data based on specified API call/response types, CPU IDs, memory locations, I/O transceivers, or some other networking attribute. The KPI server processes the KPIs and +KPIs to generate various Proxy Correlation Indices (PCIs) and combination PCIs (cPCIs). The KPI server transfers the PCIs and cPCIs (and possibly the +KPIs) to the PCI server. The PCI server processes the PCIs, cPCIs, and possibly the +KPIs to perform network tasks.

The PCI server also processes the PCIs and cPCIs to trigger the deployment of additional vProbes. The PCI server has a false-positive filter to filter these triggered vProbe deployments. When the PCI server deploys a vProbe, the false positive filter stores the PCIs and cPCIs that triggered the vProbe deployment. The stored PCIs and cPCIs often form a time-based pattern. The false-positive filter subsequently determines whether the performance of the deployed vProbe falls below a vProbe performance threshold. For example, a network operator may provide a user input indicating the failed vProbe deployment. When the false-positive filter determines that the performance of a deployed vProbe falls below its vProbe performance threshold, the false-positive filter augments its false-positive vProbe deployment criteria with the stored NFV indices that triggered the deployment of the unsuccessful vProbe.

When the PCI server processes the PCIs and cPCIs to trigger the deployment of a vProbe, the PCI server applies its false-positive filter. The false positive filter compares the PCIs and cPCIs that triggered the vProbe deployment to its false-positive vProbe deployment criteria. When the PCIs and cPCIs that triggered the vProbe deployment correspond to a previous pattern of PCIs and cPCIs that are related to a past unsuccessful vProbe, then the false-positive filter in the PCI server blocks the vProbe deployment.

Figure 4:
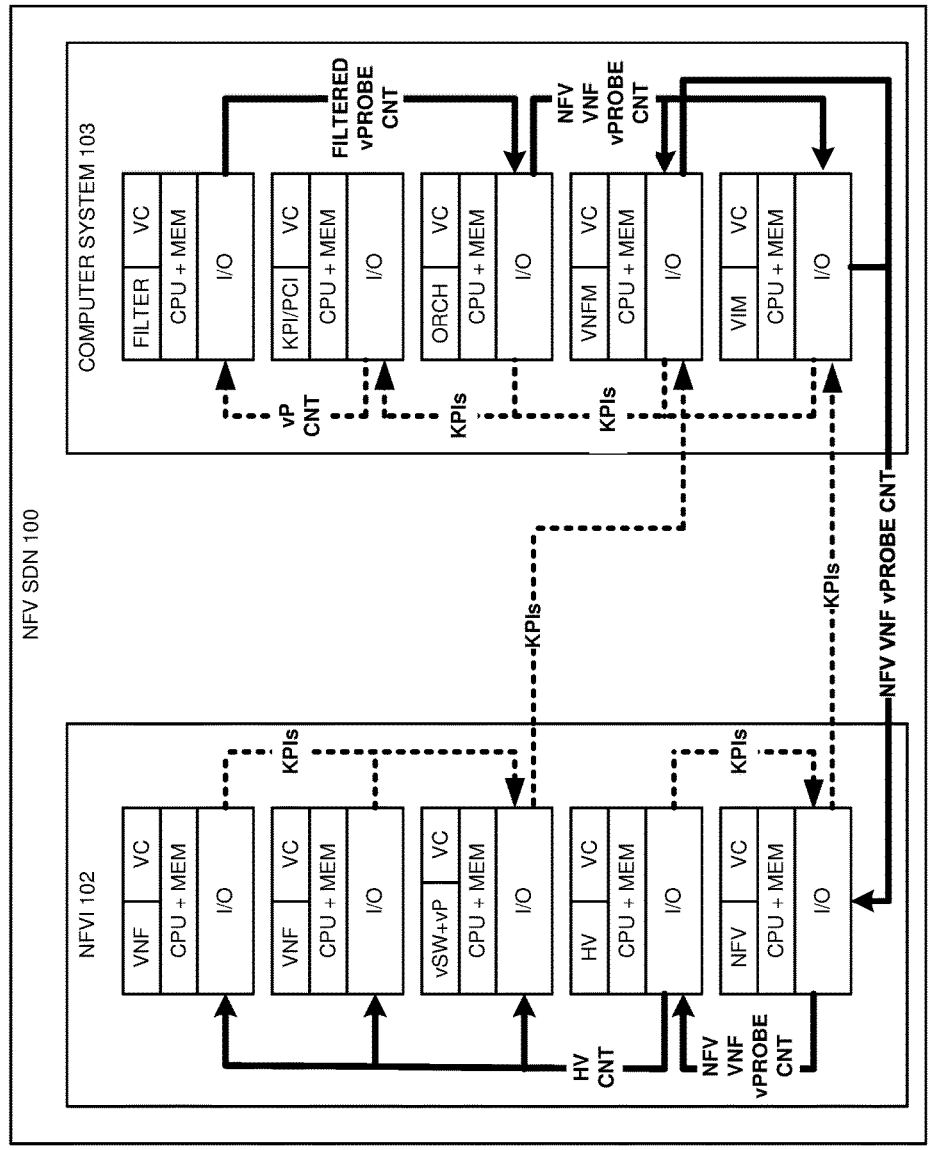

Referring to FIG. 4, NFV SDN 100 is further illustrated with an exemplary NFV architecture. NFVI 102 and computer system 103 are shown with Central Processing Unit cores (CPUs), memory units (MEM), and Input/Output transceivers (I/O). This specific hardware design is simplified for illustrative purposes, and actual hardware implementations will vary. In NFVI 102, two VNFs and their Virtual Containers (VCs) execute on CPU cores. A vSW and its VC executes on another CPU core to support the two VNFs (before vProbe (vP) deployment). A hypervisor (HV) and VC execute on a CPU core to control VNF access to the CPU cores, MEM, and I/O. An NFV interface and VC execute on a CPU core to communicate between the HV/VC and computer system 103.

In computer system 103, an ORCH and VC execute on a CPU core to orchestrate NFVI 102. A VIM and VC execute on a CPU core to direct NFVI 102 for the ORCH. A VNFM and VC execute on another CPU core to manage VNFs in NFVI 102 for the ORCH. A KPI server and VC execute on a CPU core to translate KPIs into PCIs/cPCIs. A PCI server and VC execute on a CPU core to translate the PCIs and cPCIs into VNF control data that triggers the performance of network tasks—including the deployment of virtual Probes.

The VNFs, vSW, HV, and NFV interface may all generate KPIs. The VNFs and vSW transfer their KPIs to the VNFM. The HV and NFV interface transfer their KPIs to the VIM. The VNFM and VIM generate their own KPIs and transfer the KPI data to the KPI server. In alternative examples, the vSW and the NFV interface may transfer the KPI data directly to the KPI server to bypass the VNFM and the VIM.

The KPI server processes the KPIs to generate PCIs and cPCIs for the PCI server. The PCI server processes the PCIs and cPCIs to generate vProbe deployment control data. The PCI server transfers the vProbe deployment control data to the vProbe deployment filter. The vProbe deployment filter applies its false-positive vProbe criteria to the triggering pattern of PCIs/cPCIs to detect and block false-positive vProbe deployments. When vProbes are deployed, the vProbe deployment filter stores the triggering pattern of PCIs and cPCIs to augment its false-positive vProbe deployment criteria if the vProbe deployment is unsuccessful.

The vProbe deployment filter passes the filtered vProbe deployment control data to the MANO ORCH. The ORCH processes the filtered vProbe control data to generate NFV VNF control data for the VNFM and the VIM. The VIM and VNFM transfer NFV VNF control data to the NFV interface. The NFV interface transfers the NFV VNF control data to the HV. The HV and its VC exert control to on/off-board VNFs, vSWs, vProbes, and other virtual resources. In this example, the HV/VC on-boards the vProbe (vP) into the vSW CPU core and memory. The installed vProbe then sends its FC to the vSW, and the vSW applies the FC to SDN VNF traffic that traverses the vSW. The vSW transfers the filtered VNF traffic to the vProbe. The vProbe processes the filtered VNF data to generate and transfer the KPIs for the KPI server. The PCI server processes the KPIs to perform network tasks.

For example, a wireless communication service quality index may cross a threshold that triggers the network task of creating HSS access records for a given IMSI group. The PCI server transfers the vProbe deployment trigger data to the vProbe deployment filter to block false-positive vProbe deployment based past vProbe deployment failures. If the service quality index trigger matches a false-positive service quality index pattern from a previous failed vProbe deployment, then the vProbe filter blocks the deployment and informs the PCI server. If the service quality index trigger does not match any false-positive service quality index patterns from previous failed deployments, then the vProbe filter passes the vProbe deployment instruction to the MANO ORCH. The MANO ORCH controls the VNFM and the VIM which direct the NFV interface and HV to load the vProbe for the HSS/IMSI analysis. The vProbe injects the HSS/IMSI FC for special KPIs into the vSW which filters the VNF traffic based on the FC. The vProbe transfers the KPIs to the KPI server for indexing and delivery to the PCI server. In this example, the PCI server processes the KPIs to track IMSI service access through the HSS.

Figure 5:
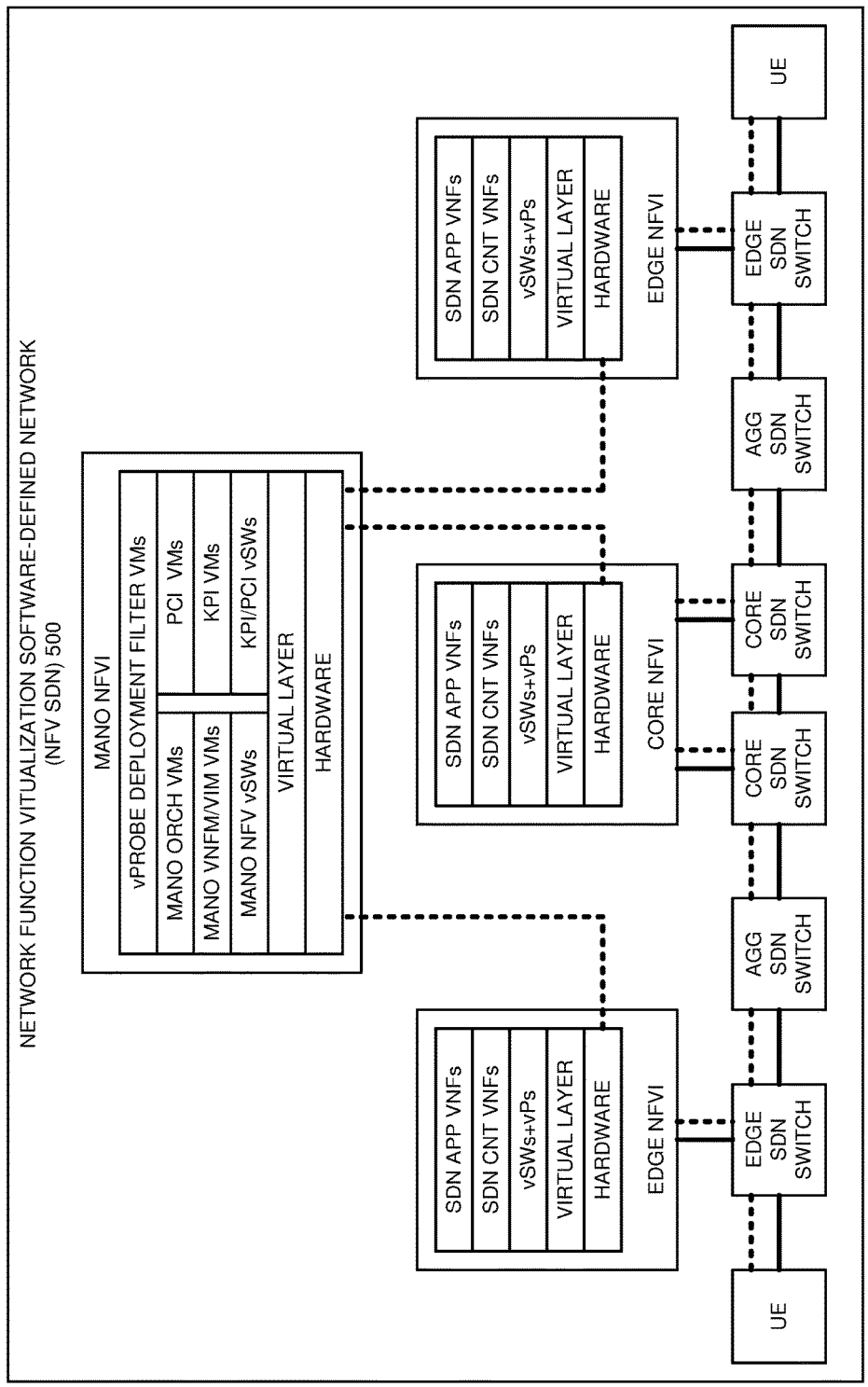
FIG. 5 illustrates a Network Function Virtualization (NFV) Software Defined Network (SDN) to filter virtual Probe (vProbe) deployments.

FIG. 5 illustrates Network Function Virtualization (NFV) Software Defined Network (SDN) 500 to control Virtual Network Functions (VNFs). NFV SDN 500 is an example of data communication system 100, although system 100 may use alternative configurations and operations. NFV SDN 500 comprises: User Equipment (UE), edge SDN switches, aggregation (AGG) SDN switches, core SDN switches, edge NFVIs, a core NFVI, and a MANO NFVI. The NFVIs comprise hardware such as server blades with CPU cores, data memories, I/O transceivers, and the like. The edge SDN switches may include wireless base station VNFs that drive nearby wireless transceivers to exchange wireless data with the UEs.

The NFVIs execute virtual layer software to provide a virtualized processing environment. The virtual layer comprises virtual hardware interfaces, hypervisors, and NFVI controllers. Under the control of the MANO system, the virtual layers support various SDN VNFs. In the edge and core NFVIs, the virtual layers support NFV virtual switches (vSWs), virtual Probes (vPs), SDN controller (CNT) VNFs, and SDN application (APP) VNFs. In the MANO NFVI, the virtual layer supports MANO vSWs, Virtual Infrastructure Manager (VIM) Virtual Machines (VMs), VNF Manager (VNFM) VMs, MANO Orchestration (ORCH) VMs, Key Performance Indicator (KPI) server VMs, Proxy Correlation Index (PCI) server VMs, and vProbe deployment filter VMs.

Under the direction of the MANO ORCH VMs, the VIM and VNFM VMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated UE SDN controller VNFs. The UE SDN controller VNFs transfer SDN data machine API calls to the SDN switches.

API responses flow back to from the SDN switches to the SDN controller VNFs and to the SDN application VNFs. If needed, an SDN application VNF may direct an SDN controller VNF to drive an SDN data machine to deliver user data to an NFVI for heavier processing by the NFV vSWs and data-processing VNFs. For example, a given flow may be directed to a VNF to perform packet inspection, encryption, or the like.

The VNFs, vSWs, vProbes, and virtual layers generate KPI data as described herein. The NFV vSWs switches also generate KPI data. The KPI server VMs receive the KPI data. The MANO VMs may exchange the KPI data between the KPI server VMs and the VNFs, vSWs, vProbes, and virtual layers. The KPI server VMs process the KPIs to develop PCIs and combination PCIs. The PCI server VMs process the data service indices against various patterns of interest to identify associated VNF controls. In particular, the PCI server VMs generate PCIs that indicate network tasks like tracking usage, analyzing efficiency, or assuring quality.

The PCI server VMs may perform the identified network tasks by activating the appropriate vProbes with task-focused Filter Criteria (FC). The PCI server VMs may need to deploy additional vProbes to perform the identified network tasks. Thus, the PCI server VMs process the PCIs and cPCIs to automatically deploy vProbes in the NFVIs. The deployed vProbes typically collect additional task-focused KPIs. For example, the deployed vProbes may collect KPIs for VNF-based network elements like Content Delivery Network (CDN) servers, Internet Protocol Multimedia Subsystem (IMS) servers, Internet protocol (IP) routers, Home Subscriber Systems (HSS), Mobility Management Entities (MMEs), Packet Data Network Gateways (P-GWs).

The vProbe deployment filter VMs maintain false-positive vProbe deployment criteria. The false-positive vProbe deployment criteria may be derived from past PCI triggers from unsuccessful vProbe deployments. The vProbe deployment filter processes vProbe deployment triggers against the false-positive vProbe deployment criteria to block some vProbe deployments. When the PCI trigger for the vProbe deployment corresponds to the false-positive vProbe deployment criteria, the vProbe deployment filter VMs block the deployment of the vProbe. When the PCI trigger does not correspond to any false-positive vProbe deployment criteria, the vProbe deployment filter VMs directs the MANO ORCH VMs to deploy the vProbe.

The historical PCI triggers from unsuccessful vProbe deployments may relate to network elements or systems that suffer temporary performance loss but that recover. In these cases, the false-positive vProbe deployment criteria corresponds to network element performance falling below a performance threshold for a first time period, but then recovering within a second time period. The network element and its corresponding performance threshold may correspond to a wireless network access point, internet protocol router, Internet Protocol Multimedia Subsystem (IMS) server, Content Delivery Network (CDN) server, and the like.

The vProbe deployment filter VMs transfers filtered vProbe deployment instructions to the MANO ORCH VMs. The filtered vProbe instructions direct the MANO ORCH VMs to install one or more vProbes with Filter Criteria (FC) to collect KPIs from the NFVIs. The MANO ORCH VMs transfer NFV control data to the MANO VIM (and possibly VNFM) VMs to on-board the vProbes with the FC. The MANO VIM (and possibly VNFM) direct the virtual layers in the NFVIs to on-board the vProbe. The installed vProbe injects its FC into one or more NFV vSWs. The vSWs apply the FC to SDN VNF traffic that traverses the NFV vSWs. The vSWs transfer the filtered VNF traffic to the vProbe. The vProbe processes the filtered VNF data to generate the KPIs for the KPI server VMs. The KPI server VMs index the KPIs to form the PCIs and the cPCIs for the PCI server VMs. The PCI server VMs process the PCIs and cPCIs to perform network tasks that may require vProbe filtering and deployment.

Figure 6:
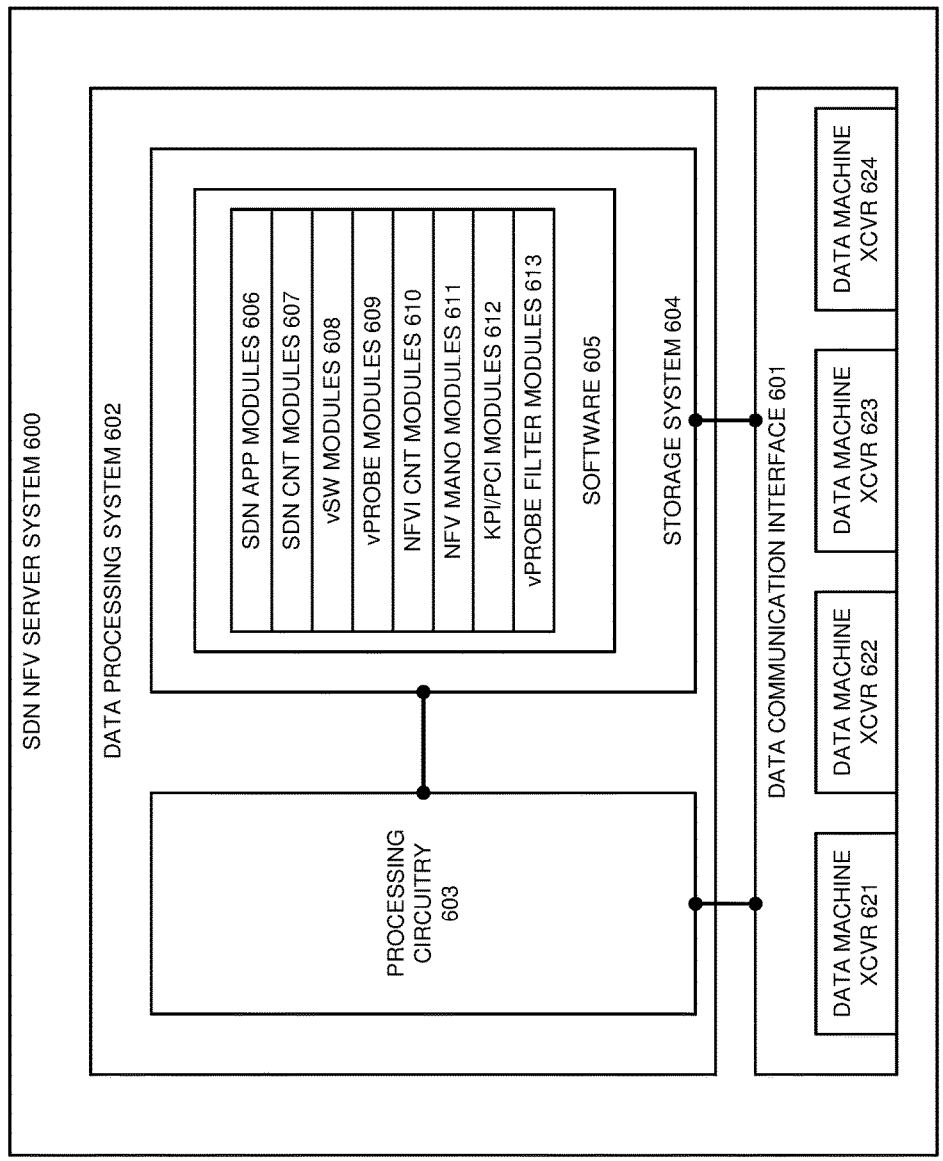
FIG. 6 illustrates a Software Defined Network (SDN) Network Function Virtualization (NFV) server system to filter virtual Probe (vProbe) deployments.

FIG. 6 illustrates Software Defined Network (SDN) Network Function Virtualization (NFV) server system 600 to control Virtual Network Functions (VNFs). SDN NFV server system 600 is an example of NFV SDN 100, although network 100 may use alternative configurations and operations. SDN NFV server system 600 comprises data communication interface 601 and data processing system 602. Data communication interface 601 comprises data machine transceivers 621-624. Data processing system 602 comprises processing circuitry 603 and storage system 604. Storage system 604 stores software 605. Software 605 includes respective software modules 606-613.

Data machine transceivers 621-624 comprise communication components, such as ports, bus interfaces, signal processors, memory, software, and the like. Processing circuitry 603 comprises server blades, circuit boards, bus interfaces, integrated circuitry, and associated electronics.

Storage system 604 comprises non-transitory, machine-readable, data storage media, such as flash drives, disc drives, memory circuitry, servers, and the like. Software 605 comprises machine-readable instructions that control the operation of processing circuitry 603 when executed. SDN NFV server system 600 may be centralized or distributed. All or portions of software 606-613 may be externally stored on one or more storage media, such as circuitry, discs, and the like. Some conventional aspects of SDN NFV server system 600 are omitted for clarity, such as power supplies, enclosures, and the like.

When executed by processing circuitry 603, software modules 606-613 direct circuitry 603 to perform the following operations. SDN application modules 606 process user and network data to drive SDN controller modules 608 to deliver data communication services to users. SDN controller modules 609 process the SDN controller API calls to generate SDN data machine API calls to drive SDN data machines to deliver data communication services to users. vSW modules 608 exchange these SDN application and controller API calls among SDN application modules 606, SDN controller modules 607, and the SDN data machines (through transceivers 621-624). vSW modules 608 also apply filter criteria from vProbe modules 609 to this SDN VNF traffic. vProbe modules 609 transfer their filter criteria to vSW modules 608 and generate KPIs based on the filtered VNF data. NFVI control modules 610 include hypervisors, virtual containers, and controller software to implement NFV VNF controls. NFV MANO modules 611 include orchestrators, VNFMs, and VIMs to direct NFVI operations—including vProbe installation and control.

Software modules 606-611 generate and transfer KPI data to KPI/PCI modules 612. KPI/PCI modules 612 process the KPIs to generate PCIs and cPCIs. KPI/PCI modules 612 process the PCIs and cPCIs to generate VNF control data that may include triggering vProbe deployment. vProbe filter modules 613 process the vProbe deployment triggers to block false-positive vProbe deployments.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) data communication system to control virtual Probe (vProbe) deployment, the method comprising:
   an NFV Management and Orchestration (MANO) system receiving Key Performance Indicators (KPIs) from an NFV Infrastructure (NFVI) and processing the NFV KPIs to generate NFV indices;
   the NFV MANO system processing the NFV indices to trigger the vProbe deployment in the NFVI, and before the vProbe deployment, comparing the NFV indices that triggered the vProbe deployment to false-positive vProbe deployment criteria;
   the NFV MANO system directing the NFVI to deploy the vProbe when the NFV indices that triggered the vProbe deployment do not correspond to the false-positive vProbe deployment criteria; and
   the NFV MANO system blocking the vProbe deployment when the NFV indices that triggered the vProbe deployment correspond to the false-positive vProbe deployment criteria.

2. The method of claim 1 wherein the NFV MANO system directs the NFVI to deploy the vProbe and further comprising the NFV MANO system storing the NFV indices that triggered the vProbe deployment.

3. The method of claim 2 further comprising the NFV MANO system determining that vProbe performance fell below a vProbe performance threshold.

4. The method of claim 3 further comprising the NFV MANO system augmenting the false-positive vProbe deployment criteria with the stored NFV indices that triggered the deployment of the vProbe responsive to the vProbe performance below the vProbe performance threshold.

5. The method of claim 1 wherein the NFV MANO system blocks the vProbe deployment and the false-positive vProbe deployment criteria corresponds to wireless network data gateway performance falling below a gateway performance threshold for a time period.

6. The method of claim 1 wherein the NFV MANO system blocks the vProbe deployment and the false-positive vProbe deployment criteria corresponds to wireless network controller performance falling below a controller performance threshold for a time period.

7. The method of claim 1 wherein the NFV MANO system blocks the vProbe deployment and the false-positive vProbe deployment criteria corresponds to wireless network access point performance falling below an access performance threshold for a time period.

8. The method of claim 1 wherein the NFV MANO system blocks the vProbe deployment and the false-positive vProbe deployment criteria corresponds to internet protocol router performance falling below a router performance threshold for a time period.

9. The method of claim 1 wherein the NFV MANO system blocks the vProbe deployment and the false-positive vProbe deployment criteria corresponds to Internet Protocol Multimedia Subsystem (IMS) server performance falling below a IMS server performance threshold for a time period.

10. The method of claim 1 wherein the NFV MANO system blocks the vProbe deployment and the false-positive vProbe deployment criteria corresponds to Content Delivery Network (CDN) server performance falling below a CDN server performance threshold for a time period.

11. A Network Function Virtualization (NFV) data communication system to control virtual Probe (vProbe) deployment, the NFV data communication system comprising one or more processors configured to:
   deploy and execute a vProbe;
   receive NFV Key Performance Indicators (KPIs) for the NFVI and process the NFV KPIs to generate NFV indices and process the NFV indices to trigger the vProbe deployment in the NFVI; and
   before the vProbe deployment, compare the NFV indices that triggered the vProbe deployment to false-positive vProbe deployment criteria and direct the NFVI to deploy the vProbe when the NFV indices that triggered the vProbe deployment do not correspond to the false-positive vProbe deployment criteria and to block the vProbe deployment when the NFV indices that triggered the vProbe deployment correspond to the false-positive vProbe deployment criteria.

12. The NFV data communication system of claim 11 wherein the-one or more processors are configured to store the NFV indices that triggered the vProbe deployment.

13. The NFV data communication system of claim 12 wherein the-one or more processors are configured to determine that vProbe performance fell below a vProbe performance threshold.

14. The NFV data communication system of claim 13 wherein the-one or more processors are configured to augment the false-positive vProbe deployment criteria with the stored NFV indices that triggered the deployment of the vProbe responsive to the vProbe performance below the vProbe performance threshold.

15. NFV data communication system of claim 11 wherein the false-positive vProbe deployment criteria corresponds to wireless network data gateway performance falling below a gateway performance threshold for a time period.

16. The NFV data communication system of claim 11 wherein the false-positive vProbe deployment criteria corresponds to wireless network controller performance falling below a controller performance threshold for a time period.

17. The NFV data communication system of claim 11 wherein the false-positive vProbe deployment criteria corresponds to wireless network access point performance falling below an access performance threshold for a time period.

18. The NFV data communication system of claim 11 wherein the false-positive vProbe deployment criteria corresponds to internet protocol router performance falling below a router performance threshold for a time period.

19. The NFV data communication system of claim 11 wherein the false-positive vProbe deployment criteria corresponds to Internet Protocol Multimedia Subsystem (IMS) server performance falling below an IMS server performance threshold for a time period.

20. The NFV data communication system of claim 11 wherein the false-positive vProbe deployment criteria corresponds to Content Delivery Network (CDN) server performance falling below a CDN server performance threshold for a time period.

* * * * *